(12) United States Patent
Ghabra et al.

(10) Patent No.: US 7,046,119 B2
(45) Date of Patent: May 16, 2006

(54) VEHICLE INDEPENDENT PASSIVE ENTRY SYSTEM

(75) Inventors: Riad Ghabra, Dearborn Heights, MI (US); Qingfeng Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 238 days.

(21) Appl. No.: 10/848,813

(22) Filed: May 19, 2004

(65) Prior Publication Data

US 2005/0258936 A1 Nov. 24, 2005

(51) Int. Cl.
H04Q 9/00 (2006.01)
G08B 13/14 (2006.01)
H04B 1/04 (2006.01)
H01Q 1/32 (2006.01)

(52) U.S. Cl. ............... 340/5.72; 340/572.7; 340/5.61; 340/5.62; 455/127.2; 343/711

(58) Field of Classification Search ........... 340/5.72, 340/572.7, 5.61, 5.62, 5.63, 5.64; 455/127.2, 455/127.3, 127.9; 343/711
See application file for complete search history.

(56) References Cited

U.S. PATENT DOCUMENTS

| 6,396,412 | B1 | 5/2002 | Banas |
| 6,570,486 | B1 | 5/2003 | Simon et al. |
| 6,597,897 | B1 | 7/2003 | Tang |
| 6,906,612 | B1* | 6/2005 | Ghabra et al. ............ 340/5.61 |
| 6,954,620 | B1* | 10/2005 | Rotta et al. ............ 455/115.1 |
| 6,978,126 | B1* | 12/2005 | Blaker et al. ............ 455/352 |
| 2001/0052839 | A1 | 12/2001 | Nahata et al. |
| 2002/0033752 | A1 | 3/2002 | Greenwood et al |
| 2002/0160720 | A1 | 10/2002 | Meradi |
| 2003/0001723 | A1 | 1/2003 | Masudaya |
| 2003/0193388 | A1 | 10/2003 | Ghabra et al. |
| 2003/0216124 | A1 | 11/2003 | Emmerling et al. |
| 2003/0222757 | A1 | 12/2003 | Ghabra et al. |

* cited by examiner

Primary Examiner—Michael Horabik
Assistant Examiner—Scott Au
(74) Attorney, Agent, or Firm—MacMillan, Sobanski & Todd, LLC

(57) ABSTRACT

A passive entry system for a vehicle of a particular model communicates with a portable fob that may be located in either an interior and an exterior of the vehicle. An internal antenna is disposed in the interior and an external antenna is disposed in the exterior. At least one amplifier drives at least one of the antennas and has a configurable gain. A controller is coupled to the amplifier for transferring at least one of internal and external software-configured gain values to the amplifier for controlling a transmission power of interrogation signals broadcast by the internal and external antennas, respectively. The software-configured gain values are obtained in an advance calibration procedure with respect to the particular model of the vehicle.

14 Claims, 4 Drawing Sheets

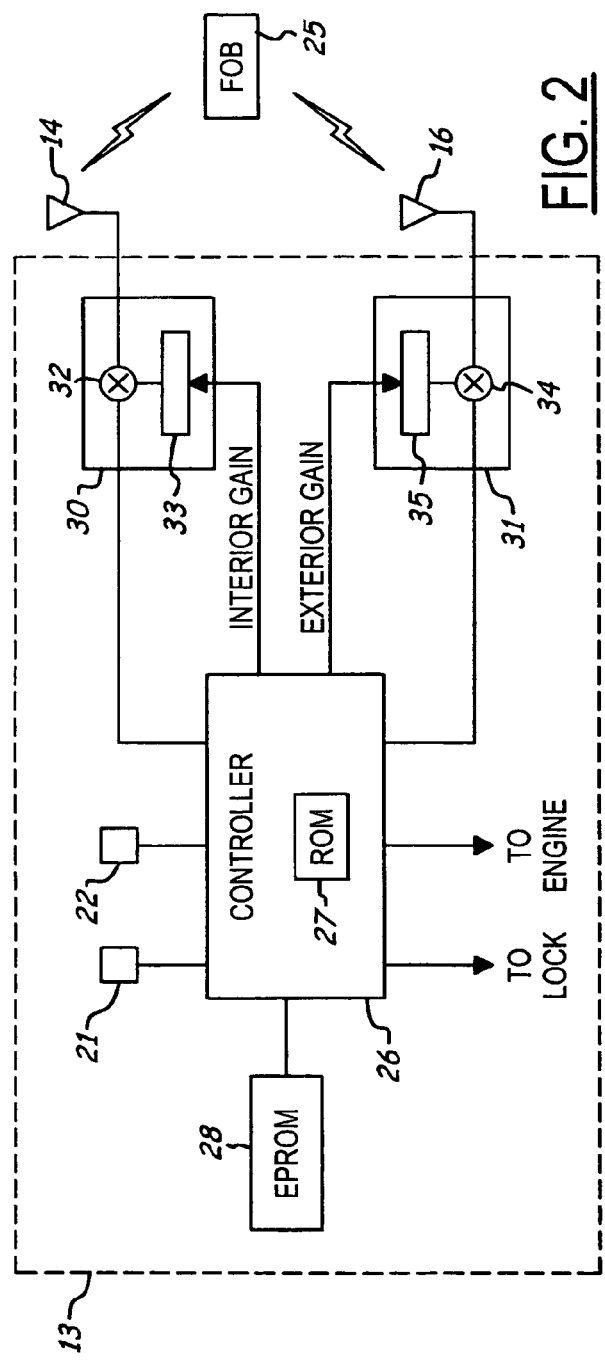
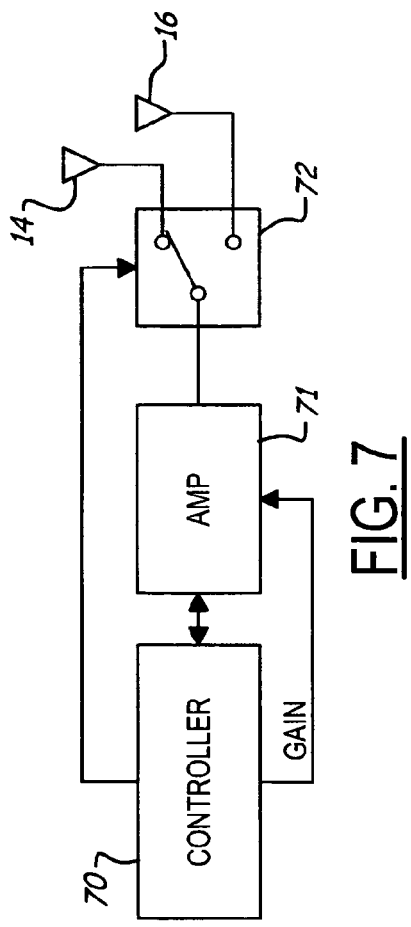

VEHICLE INDEPENDENT PASSIVE ENTRY SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to passive entry systems for passenger vehicles, and, more specifically, to an electronic module for passive entry systems that is easily customized to function correctly in any particular model of vehicle despite differences in vehicle dimensions, antenna locations, and presence of signal attenuating structures.

It is well known in the automotive industry to provide for remote vehicle access, such as through the use of remote keyless entry (RKE) systems. RKE systems may be characterized as active or passive in nature. In an active system, a switch or pushbutton on a remote transmitter must be activated by an operator in order to have a desired remote function performed, such as locking or unlocking the vehicle doors. In contrast, a passive entry system does not require a pushbutton activation by an operator in order to have a desired remote function performed.

In passive entry systems, a remote transceiver is provided which is commonly referred to as a "fob" or a "card." Such a fob or card may be attached to a key chain as a separate unit, or may be part of the head of an ignition key. The fob or card automatically transmits radio frequency (RF) signals to a vehicle in order to perform any of a variety of remote vehicle functions, such as unlocking a vehicle door, enabling the vehicle engine, and/or activating internal and/or external vehicle lights.

Passive entry systems include a transceiver in an electronic control module installed in the vehicle. The vehicle transceiver and/or control module is provided in communication with various vehicle devices in order to perform a variety of functions. For example, the vehicle transceiver and/or control module may be provided in communication with a door lock mechanism in order to unlock a vehicle door in response to an unlock request, or may be provided in communication with the vehicle engine in order to start the engine in response to an engine start request.

A sensor or switch may be provided in a vehicle door handle in order to provide the unlock request. More particularly, when the vehicle owner makes physical contact with the door handle, such as by grasping or pulling the handle, such a sensor provides the vehicle transceiver and/or control module with an indication of such contact. After receiving such an indication, the vehicle transceiver and/or control module automatically transmits a passive entry challenge signal. Upon receipt of the challenge signal, the remote transceiver fob or card carried by the user determines if the challenge signal is valid and, if so, automatically transmits a response which includes a unique identification code of the fob. The vehicle transceiver and/or control module compares the identification code with the codes of authorized fobs and if a match is found then the control module generates a control signal that is transmitted to the door lock mechanism for use in unlocking the vehicle door.

In performing passive entry functions, it is often necessary to localize (i.e., determine the location of) the user carrying the fob in deciding whether a particular passive entry function should be performed. For example, when the vehicle door handle is activated to generate a door unlock request, the lock should actually be unlocked only if an authorized fob is located in the vehicle exterior. Otherwise, the vehicle door could be unlocked and opened by anyone outside the vehicle merely because an authorized user is present inside the vehicle. By way of another example, if a user activates a passive engine start switch inside the vehicle, the engine should actually be started only if an authorized user is present inside the vehicle.

One known method for determining the location of a fob is to employ separate vehicle antennas arranged to radiate primarily in the interior of the vehicle s and primarily in the exterior of the vehicle, respectively. In one particular type of system, the portable fob measures the received signal strength of the interrogation signals (i.e., challenge signals) from each of the respective antennas and then includes the signal strength information as part of a response message to the vehicle. The vehicle module then compares the signal strength at which the fob received the interior and exterior transmitted interrogation signals in determining whether the fob is present in the interior or exterior regions of the vehicle.

In order to properly distinguish between the interior and exterior locations, the transmission power of the interrogation signals broadcast from each of the antennas must be properly adjusted so that a fob located in the interior always receives a stronger signal from the interior antenna and so that a fob located in the exterior always receives a stronger signal from the exterior antenna. Transmission power is typically controlled by setting the gain of an amplifier that drives the respective antennas. Since the radio frequency environment of every particular model of vehicle is different due to variations in antenna location, vehicle dimensions, and the presence 20 of signal attenuating structures such as doors, windows, and vehicle trim panels, the appropriate transmission power is dependent upon the identity of the particular vehicle model. Therefore, a separate electronic module design has been required for each vehicle model so that an appropriate transmission power and radiation pattern is achieved for each unique vehicle environment. However, separate unique designs for each vehicle model result in increased cost of product development, manufacturing, and distribution.

SUMMARY OF THE INVENTION

The present invention has the advantage of providing a common hardware platform for a passive entry electronic module that can be easily adapted for use with any particular model of vehicle. Consequently, costs of product development, manufacturing, and distribution are reduced.

In one aspect of the invention, a passive entry system is provided for a vehicle of a particular model, the vehicle having an interior and an exterior. An internal antenna is disposed in the interior and an external antenna is disposed in the exterior. At least one amplifier drives at least one of the antennas and has a configurable gain. A controller is coupled to the amplifier for transferring at least one of internal and external software-configured gain values to the amplifier for controlling a transmission power of interrogation signals broadcast by the internal and external antennas, respectively. The software-configured gain values are obtained in an advance calibration procedure with respect to the particular model of the vehicle.

BRIEF DESCRIPTION OF THE DRAWINGS

FIG. 2 is a block diagram showing a passive entry electronic module in greater detail.

FIG. 7 is a block diagram showing an alternative embodiment using a shared amplifier selectably coupled to the interior and exterior antennas.

DETAILED DESCRIPTION OF PREFERRED EMBODIMENTS

Figure 1:
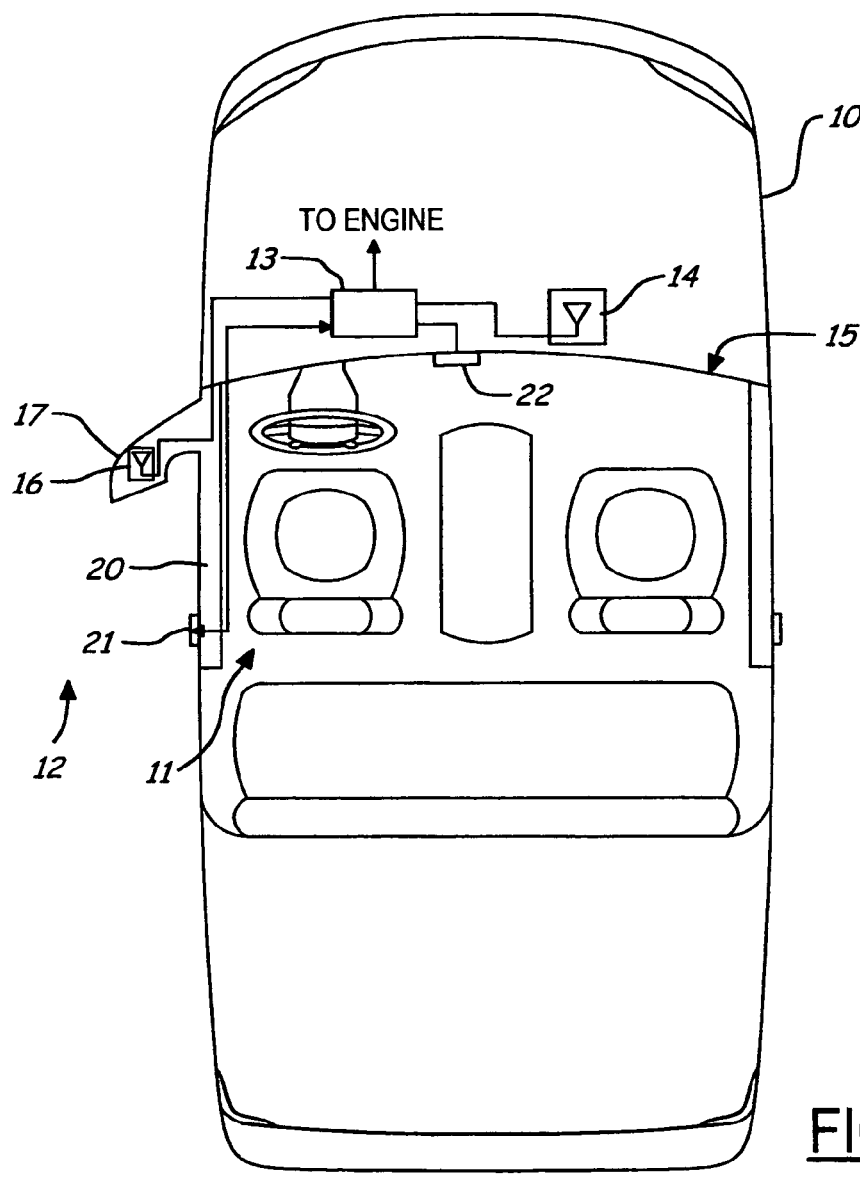
FIG. 1 is a schematic view of a passive entry system deployed in a particular model of vehicle.

Referring to FIG. 1, a vehicle 10 has an interior region 11 and an exterior region 12. A passive entry electronic module 13 is coupled to an interior antenna 14, which may be mounted to a vehicle instrument panel 15, for example. Module 13 is also coupled with an exterior antenna 16, which may preferably be mounted in an exterior structure such as a side view mirror housing 17 or in a door such as door 20.

Vehicle door 20 may provide a portion of a border between interior region 11 and exterior region 12. A door handle 21 includes an activation switch and a lock actuator mechanism, which are both coupled to module 13. By lifting door handle 21, a user generates a door unlock request that causes module 13 to interrogate for an authorized fob. An engine start switch 22 may also be provided on instrument panel 15 coupled to module 13 in order to generate a user request for starting the vehicle engine.

Passive entry module 13 is shown in partial detail in FIG. 2. A main controller 16 includes a read-only memory (ROM) 27 for containing a software program executed by controller 26. An electrically programmable read-only memory (EPROM) 28 is coupled to controller 26 for storing calibration and other data as is known in the art. Calibration data may include gain values as described herein. Alternatively, the calibrated gain values of the present invention may be included within software code stored in ROM 27, thereby providing a unique software version for each particular vehicle model having module 13 installed therein.

Module 13 includes an antenna driver 30 for driving interior antenna 14 and an antenna driver 31 for driving exterior antenna 16. Antennas 14 and 16 provide bi-directional communication with a portable fob 25 by virtue of also being connected to a receiver (not shown). Drivers 30 and 31 may be analog or digitally controlled in response to an interior gain value and an exterior gain value from controller 26. The gain values may be stored in EPROM 28, for example. Driver 30 includes a bi-directional variable-gain signal amplifier 32 and a gain block 33 which receives the interior gain value. Likewise, driver 31, includes a bidirectional variable-gain signal amplifier 34 and a gain block 35 which receives the exterior gain value. If the same interior and exterior gain values are used for all passive entry functions, then the interior and exterior gain values can be set once during a power-up initialization sequence of module 13. Otherwise, the interior gain values may be transferred to drivers 30 and 31 periodically during operation of the passive entry functions as needed.

Figure 3:
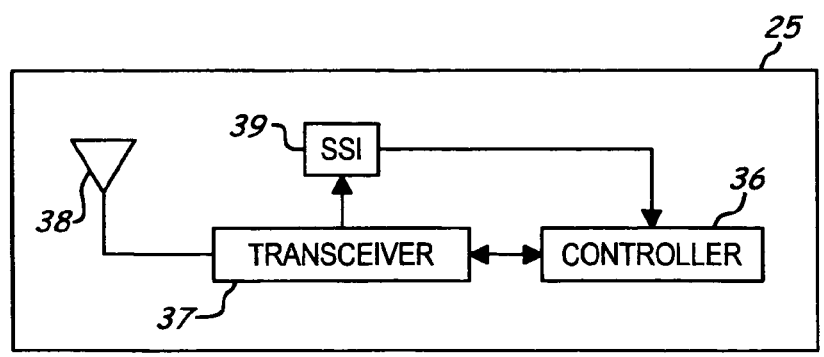
FIG. 3 is a block diagram showing a portable fob in greater detail.

FIG. 3 shows fob 25 in greater detail. A fob controller 36 is coupled by a transceiver 37 to an antenna 38. Alternatively, a separate receiver and transmitter may be utilized to accommodate differences in the frequencies used. Interrogation signals broadcast by the vehicle passive entry module are received by transceiver 37 and detected by controller 36. If the interrogation signals are valid (i.e., correspond to a recognized vehicle and function), controller 36 generates a response message which is broadcast via transceiver 37 and antenna 38 to the vehicle passive entry module. During reception of the interrogation signals, a signal strength indicator block 39 determines received signal strength and generates a signal strength indication. The signal strength indication is included in the response message assembled by controller 36 according to a predetermined message protocol.

Figure 4:
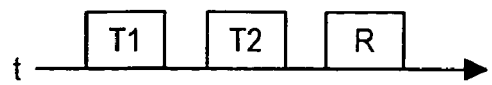
FIG. 4 is a signal diagram showing a message sequence of the present invention.

The message sequence of the present invention is shown in FIG. 4. In response to a user request or other trigger event such as the lifting of a door handle or the activation of an engine start switch, a first interrogation signal T1 is sent from a first one of the interior or exterior antennas of the passive entry module. Assuming a fob is present in a location close enough to receive interrogation signal T1, then the fob records the received signal strength and waits for a second interrogation signal. After a predetermined time delay, the passive entry module broadcasts an interrogation signal T2 using the other one of the interior or exterior antennas. The second interrogation signal preferably includes an encrypted challenge-response message as known in the art while the first interrogation signal is merely a short message identifying the vehicle and allowing the fob to make and retain a signal strength measurement. If a fob receives the second interrogation signal, then it generates a response message R that includes a reply to the challenge-response message as well as indications of the received signal strength associated with reception of the first and second interrogation signals. If the fob only receives the second interrogation signal (e.g., signal strength was insufficient to receive the first interrogation signal based on the location of the fob), then the corresponding signal strength reported by the fob is set to zero.

Preferably, the second interrogation signal is broadcast from the interior or exterior antenna corresponding to the location where the user is expected to be based upon the type of passive entry function being requested. In an alternative embodiment, separate responses from the fob could be generated immediately after each interrogation signal.

Figure 5:
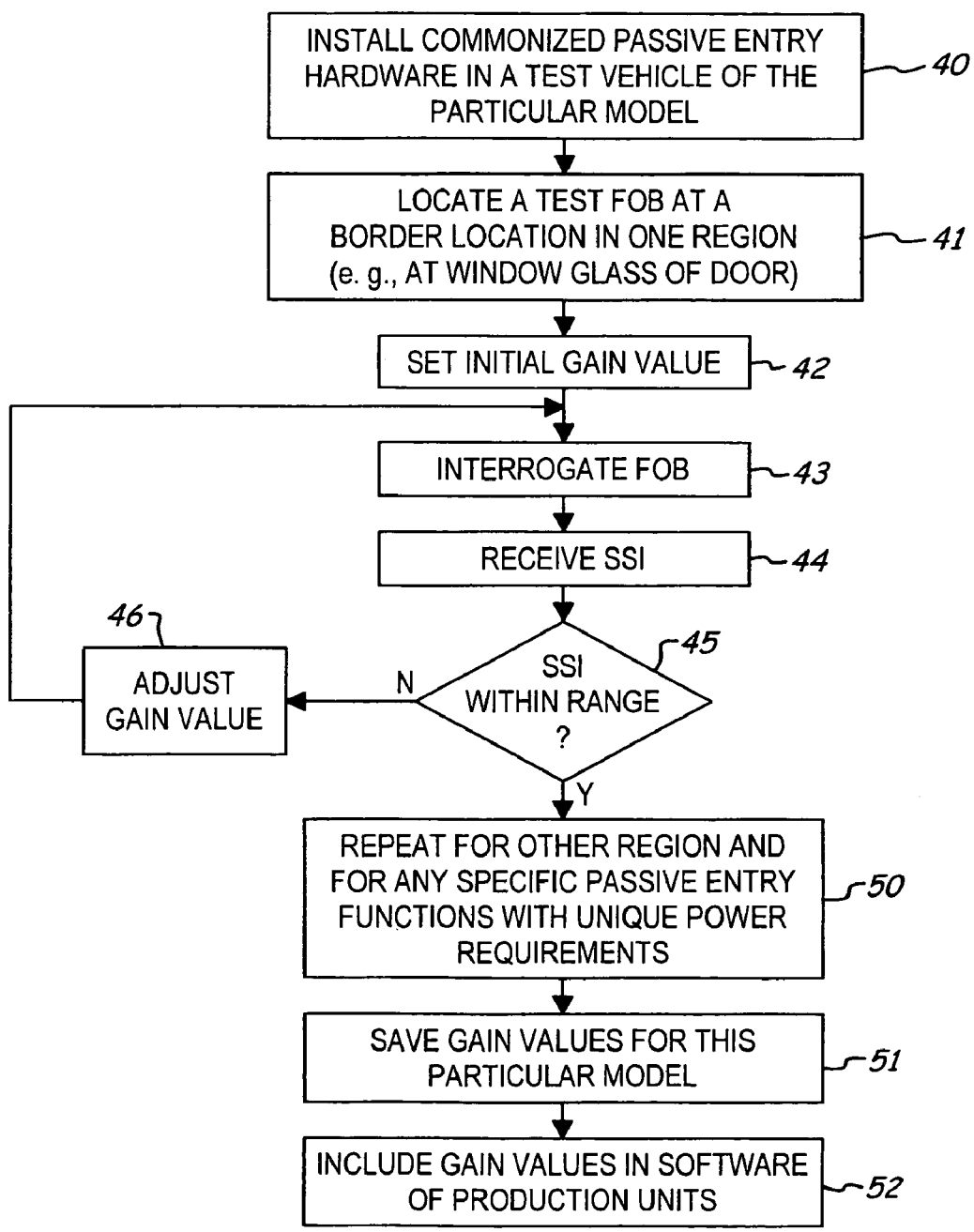
FIG. 5 is a flowchart of one preferred embodiment of an advance calibration procedure of the present invention.

In order to properly localize the fob based on the indicated received signal strengths, it is desirable that the signal strength from the internal antenna as received by a fob located exterior of the vehicle must be either non-existent or very weak. Furthermore, the signal strength received by a fob located in the interior of the vehicle from the exterior antenna or antennas must always be lower than the signal strength received from the interior antenna. A method for calibrating the software-configured gain values to be used for a particular model of vehicle as shown in FIG. 5. In step 40, a commonized passive entry hardware system is installed in a test vehicle of the particular model into which production units of the passive entry system are to be installed. The installation preferably uses the actual antenna configurations that will be used in normal vehicle production. A test fob is located at a border location in one of the interior or exterior regions in step 41. For example, the fob may be located at an interior surface of the window glass of a door when calibrating the interior gain value.

An initial gain value is set in step 42 for the one of the interior or exterior amplifiers being calibrated first. An interrogation signal is sent to the fob in step 43 and the received signal strength indication is obtained in step 44. The response message from the fob may typically be received using special test equipment (e.g., a s modified vehicle module) which compares the received signal strength indication to a predetermined range of signal strength in step 45 wherein the range corresponds to a target signal strength for the desired reception conditions for the particular model being calibrated. If the signal strength indication (SSI) is not within the range then the gain value is adjusted in step 46 and a return is made to step 43 for repeating the interrogation signal. If the SSI is within the range, then the current gain value is assigned as the final gain value. In step 50, the foregoing process is repeated for the other interior or exterior region and for any specific passive entry functions that have unique power requirements. After all regions and functions have been calibrated, the gain values for this particular vehicle model are saved in step 51. The saved gain values are then included within the software of production units in step 52 either by embedding them in ROM code that is specific to a module being installed in the particular vehicle model, or by "burning" these gain values into an electronically programmable memory within the passive entry module (e.g., at the vehicle assembly plant during installation of the module into a vehicle).

Figure 6:
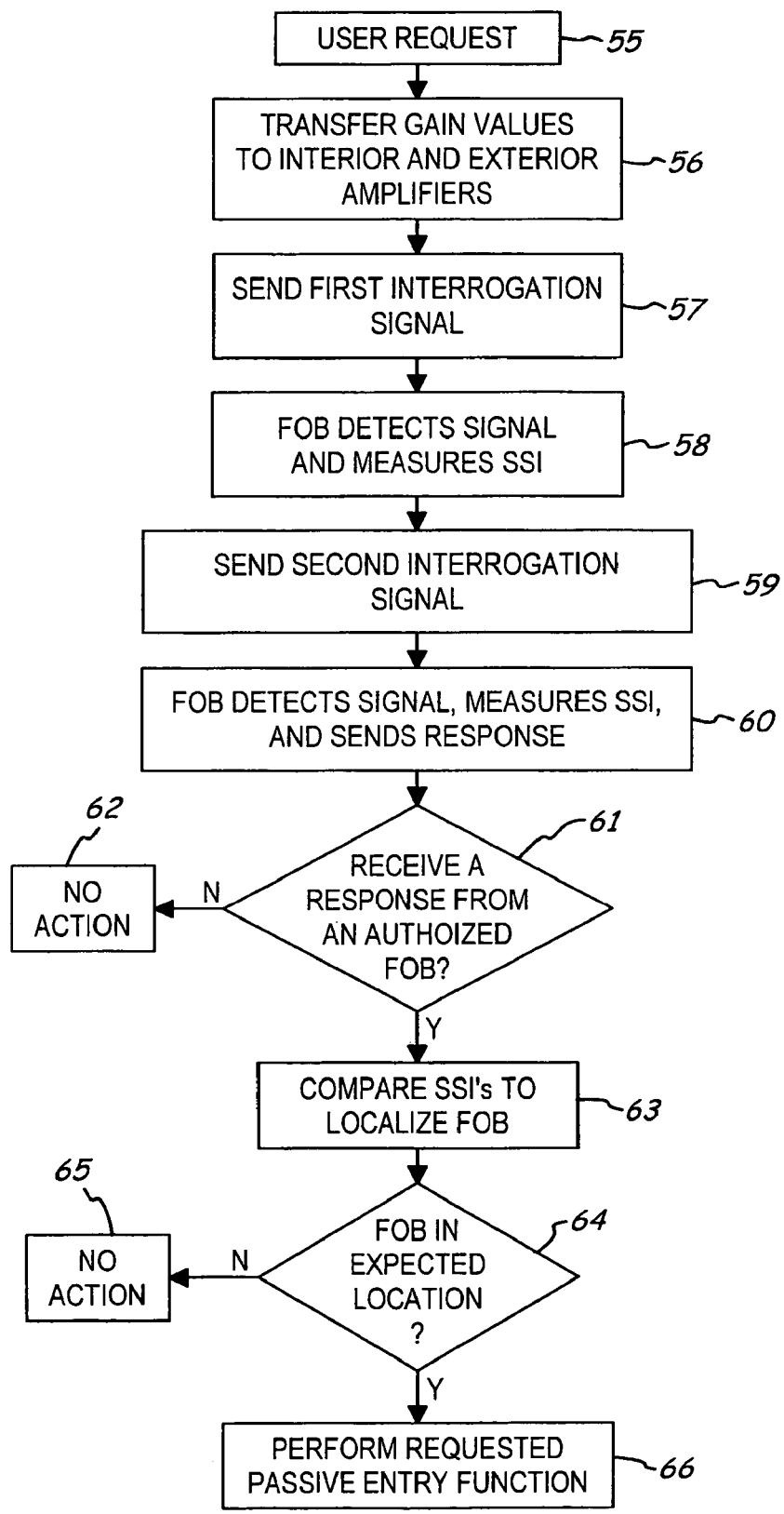
FIG. 6 is a flowchart of one preferred embodiment for operating a passive entry system of the present invention.

A preferred method for operating a passive entry system according to the present invention is shown in FIG. 6. A user request is generated in step 55 when a user activates a door handle or presses an engine start switch, for example. In step 56, the gain values are transferred to the interior and exterior amplifiers according to their calibration values and according to the specific passive entry function being requested as appropriate. If the interior and exterior gain values each have only one respective value for the particular vehicle model for all passive entry functions, then the gain values can be transferred during a power-up initialization sequence rather than during each activation of the passive entry system as shown in step 56.

In step 57, a first interrogation signal is sent from a selected one of the interior or exterior antennas. If present, the fob detects the interrogation signal and measures an SSI in step 58. After an appropriate delay, a second interrogation signal is sent in step 59 from the other one of the interior or exterior antenna. Preferably, the order of interrogating the interior and exterior regions of the vehicle is chosen so as to first interrogate the expected location of the fob for the requested action (e.g., interrogating the interior first for an engine start request and interrogating the exterior first for a door unlock request). If present, the fob detects the second interrogation signal, measures an SSI, and sends a response message in step 60.

In step 61, a check is made to determine whether a response has been received from an authorized fob (i.e., a fob that achieves a correct challenge-response exchange). If no response is received or the fob is not authorized, then no action is taken and the process ends at step 62. If the fob is authorized, then the received signal strength values from the SSI's are compared in step 63 in order to localize the fob. A check is made in step 64 to determine whether the fob is in the expected location. If not, then the method terminates by taking no action at step 65. Otherwise, the requested passive entry function is performed in step 66 by unlocking a door or initiating an engine start, for example.

FIG. 7 shows an alternative embodiment of the present invention using a single antenna driver (i.e., amplifier) shared between the interior and exterior antennas. A controller 70 is coupled to an amplifier 71 for sending interrogation signals to the antennas. A software-configurable gain value is provided from controller 70 to amplifier 71. The output of amplifier 71 is selectively coupled to interior antenna 14 or exterior antenna 16 by a switch 72 under control of controller 70. Thus, controller 70 coordinates the selected antenna with the appropriate gain value for interrogating the interior and exterior regions as previously described.

In view of the foregoing, a vehicle passive entry system has been shown wherein the gain of the low frequency power amplifiers for the vehicle transceiver are software controlled in order to avoid hardware variations between different models of vehicles. This vehicle module is used in conjunction with a fob that can determine relative signal strengths of the interrogation signals coming from the various antennas. Using a model-specific calibration, power levels of the interrogation signals are just strong enough to meet certain criteria established by a system designer. The gain ranges that are deemed to correspond to a particular location are empirically determined during product development for a particular vehicle platform. The amplifiers may preferably be embodied in an application specific integrated circuit (ASIC) for implementing the transceivers and providing a controllable amplification in response to gain commands from a main microprocessor in the passive entry module. The amplifier may further include a boost converter for implementing the variable gain.

By providing a controllable gain, it is also possible to vary power levels depending upon the passive entry function being requested. For example, the power of the interior antenna can be made weaker when localizing the portable fob in response to a door unlock request.

What is claimed is:

1. A passive entry system for a vehicle of a particular model, said vehicle having an interior and an exterior, said system comprising:
   an internal antenna disposed in said interior;
   an external antenna disposed in said exterior;
   at least one amplifier driving at least one of said antennas and having a configurable gain; and
   a controller coupled to said amplifier for transferring at least one of internal and external software-configured gain values to said amplifier for controlling a transmission power of interrogation signals broadcast by said internal and external antennas, respectively, said software-configured gain values being obtained in an advance calibration procedure with respect to said particular model of said vehicle.

2. The passive entry system of claim 1 further comprising:
   a portable fob for receiving said interrogation signals from said antennas and transmitting a response message to said controller, said response message including an indication of a received signal strength of a corresponding interrogation signal;
   wherein said controller determines whether said portable fob is located in said interior or said exterior in response to said indication of received signal strength.

3. The passive entry system of claim 2 wherein said controller sequentially generates a first interrogation signal via one of said internal antenna or said external antenna, generates a second interrogation signal via the other one of said internal antenna or said external antenna, receives said response message, and compares said indication of received signal strength corresponding to said first and second interrogation signals to localize said fob.

4. The passive entry system of claim 1 comprising first and second amplifiers for driving said interior and exterior antennas, respectively, and for receiving said interior and exterior software-configured gain values, respectively.

5. The passive entry system of claim 1 further comprising a switch for selectably coupling said amplifier to either said interior antenna or said exterior antenna.

6. The passive entry system of claim 1 wherein said controller generates said interrogation signals in response to a user request for a passive entry function.

7. The passive entry system of claim 6 wherein said user request identifies a selected one of a plurality of passive entry functions, and wherein said interior and exterior software-configured gain values are determined in response to said selected one of said passive entry functions.

8. The passive entry system of claim 7 wherein said plurality of passive entry functions includes a vehicle unlock function and an engine start function, wherein said exterior software-configured gain value is boosted relative to said interior software-configured gain value when said vehicle unlock function is selected, and wherein said interior software-configured gain value is boosted relative to said exterior software-configured gain value when said engine start function is selected.

9. A method of operating a passive entry system for a vehicle of a particular model, said vehicle having an interior and an exterior, an interior antenna disposed in said interior, an exterior antenna disposed in said exterior, at least one amplifier driving at least one of said antennas and having a configurable gain, and a controller coupled to said amplifier for controlling said configurable gain, said passive entry system further including a portable fob to be carried by a user, said method comprising the steps of:
    detecting a user request for a passive entry function;
    transferring at least one of an interior software-configured gain value or an exterior software-configured gain value to said amplifier, said software-configured gain values being obtained in an advance calibration procedure with respect to said particular model of said vehicle;
    transmitting first and second interrogation signals from said interior antenna and said exterior antenna, respectively, having a transmission power according to said software-configured gain values;
    receiving said interrogation signals in said fob;
    transmitting from said fob a response message including respective indications of a received signal strength;
    receiving said response message in said controller;
    determining whether said portable fob is located in said interior or said exterior in response to said indications of received signal strength; and
    performing said requested passive entry function if said determined location matches an expected location corresponding to said requested passive entry function.

10. The method of claim 9 wherein said controller sequentially generates a first interrogation signal via one of said internal antenna or said external antenna, generates a second interrogation signal via the other one of said internal antenna or said external antenna, receives said response message, and compares said indications of received signal strength to localize said fob.

11. The method of claim 9 wherein said user request identifies a selected one of a plurality of passive entry functions, and wherein said interior and exterior software-configured gain values are determined in response to said selected one of said passive entry functions.

12. The method of claim 9 wherein said plurality of passive entry functions includes a vehicle unlock function and an engine start function, wherein said exterior software-configured gain value is boosted relative to said interior software-configured s gain value when said vehicle unlock function is selected, and wherein said interior software-configured gain value is boosted relative to said exterior software-configured gain value when said engine start function is selected.

13. The method of claim 9 wherein said advance calibration procedure comprises the steps of:
    placing a test fob at an inside border position in said interior of said particular model;
    selecting an initial value for said software-configured interior gain value;
    transmitting an interrogation signal using said initial value;
    receiving a response message from said test fob including said indication of received signal strength;
    comparing said indicated received signal strength with a predetermined range of signal strength;
    if said indicated received signal strength is outside said predetermined range of signal strength then iteratively modifying said software-configured interior gain value and repeating said transmitting, receiving, and comparing steps until said software-configured interior gain value has a final value that results in said indicated received signal strength being within said predetermined range of signal strength; and
    storing said final value for inclusion in software contained in said passive entry system for said particular model.

14. The method of claim 13 wherein said advance calibration procedure further comprises the steps of:
    placing a test fob at an outside border position in said exterior of said particular model;
    selecting an initial value for said software-configured exterior gain value;
    transmitting an interrogation signal using said initial value;
    receiving a response message from said test fob including said indication of received signal strength;
    comparing said indicated received signal strength with a predetermined range of signal strength;
    if said indicated received signal strength is outside said predetermined range of signal strength then iteratively modifying said software-configured exterior gain value and repeating said transmitting, receiving, and comparing steps until said software-configured exterior gain value has a final exterior value that results in said indicated received signal strength being within said predetermined range of signal strength; and
    storing said final exterior value for inclusion in software contained in said passive entry system for said particular model.

* * * * *